United States Patent
Lucas

[11] Patent Number: 5,819,626
[45] Date of Patent: Oct. 13, 1998

[54] PORTABLE SAWMILL

[76] Inventor: Rex Cameron Lucas, RMB 1090, Beechworth, Victoria, Australia, 3747

[21] Appl. No.: 716,392
[22] PCT Filed: Mar. 23, 1995
[86] PCT No.: PCT/AU95/00163
   § 371 Date: Sep. 20, 1996
   § 102(e) Date: Sep. 20, 1996
[87] PCT Pub. No.: WO95/25619
   PCT Pub. Date: Sep. 28, 1995

[30] Foreign Application Priority Data

| Mar. 23, 1994 | [AU] | Australia | PM 4643 |
| Jun. 6, 1994 | [AU] | Australia | PM 6149 |
| Nov. 14, 1994 | [AU] | Australia | PM 9414 |

[51] Int. Cl.⁶ .................................................. B27B 7/00
[52] U.S. Cl. ........................ 83/489; 83/485; 83/508.12; 83/574; 83/859; 144/286.1; 144/376
[58] Field of Search ............................ 83/485, 488, 489, 83/508.2, 574, 859; 144/376, 286.1, 286.5

[56] References Cited

U.S. PATENT DOCUMENTS

| 2,800,932 | 7/1957 | Scott | 83/485 |
| 2,973,789 | 3/1961 | Palmer | 83/508.2 |
| 4,584,918 | 4/1986 | Stubbe et al. | 83/488 X |
| 4,792,190 | 12/1988 | Bertrand | 83/488 X |
| 4,798,113 | 1/1989 | Viazanko | 144/286.1 X |
| 5,046,391 | 9/1991 | Lewis et al. | 83/485 X |
| 5,273,090 | 12/1993 | Klemma | 83/574 X |
| 5,442,984 | 8/1995 | Tate | 83/574 X |

FOREIGN PATENT DOCUMENTS

| 3198384 | 8/1985 | Australia . |
| 6327486 | 4/1987 | Australia . |
| 3497489 | 11/1989 | Australia . |
| 2731488 | 12/1989 | Australia . |

*Primary Examiner*—Eugenia Jones
*Attorney, Agent, or Firm*—Richard M. Goldberg

[57] ABSTRACT

A portable sawmill with lateral and longitudinal stability which includes first and second rectangular end frames, each end frame including two horizontal and two vertical members, longitudinal, horizontal rails slidably connected by brackets to corresponding first and second vertical members, first and second winding assemblies, each winding assembly includes bearings journalling an upper one of the horizontal members, a handle to rotate the upper horizontal frame member, an idler wheel located at a lower end of each of the vertical frame members, and a flexible joining connection for each bracket, the flexible joining connection is engaged about the respective upper frame member and a respective idler wheel and connected at both ends to the respective bracket to move the bracket in both directions up and down the respective vertical frame member to thereby move the rails.

9 Claims, 9 Drawing Sheets

PORTABLE SAWMILL

FIELD OF THE INVENTION

This invention relates to a portable sawmill with improved lateral and longitudinal stability

BACKGROUND OF THE INVENTION

A timber sawing device comprising a single circular sawblade, which pivots through 90° to act in both the horizontal and vertical planes, is known. As is known, this sawblade is mounted together with an engine on a laterally movable carriage which in turn is mounted on a longitudinally movable cross-bed which may travel along two rails between which the operator has access. Again, as is known, these rails have been mounted on end frames located in a predetermined position and the rails have been manually and independently raised and lowered at the two support points on each end frame.

One object of the invention is to provide a portable sawmill having improved stability of the frame.

Another object of the invention is to provide a portable sawmill with improved operation and stability of the saw means, ease of erection, assembly and operation, for example, by a single operator even in rough conditions.

BRIEF SUMMARY OF THE INVENTION

Broadly in one aspect of the invention there is provided a portable sawmill with lateral and longitudinal stability which comprises:
 (a) first and second end frame means;
 (b) a pair of longitudinal rails extending between the first and second end frame means;
 (c) bracket means for slidably connecting said rails to said first and second end frame means;
 (d) moving means on said first and second end frame means, said moving means connected to said bracket means for adjustably moving said rails in unison between upper and lower positions on the end frame means and for retaining said rails in an adjusted position; and
 (e) carriage means for a pivotal sawblade mounting and prime mover, said carriage means engageable with said rails and longitudinally movable thereon.

Preferably, brace means are connected to an upper region of one or both vertical members of the end frames, the means of connection is such that each brace means may be altered in attitude with respect to its respective vertical member to provide lateral support to the sawmill or to align the sawmill with a log, the brace means being adjustable in length.

In a preferred form each bracket comprises:
 a bracket body;
 support means adapted to hold a rail; and
 sliding means adapted to fit a vertical member and permit the bracket body to be moved up and down the vertical member.

The sawmill further includes a rail supporting means comprising:
 (a) a vertically extending braced support; and
 (b) a sleeve adapted to extend at least partially around the braced support and movable therealong,
wherein the sleeve is attachable to a rail whereby the rail and hence the sawmill may be supported.

The sawmill preferably further includes a drive means which comprises:

an engine having a driveshaft,
 the centerline of the driveshaft being mounted below and as close as possible to the axis through which a sawblade forming part of the sawmill pivots.

Still further, the sawmill includes movement control means which comprises:
 a resilient elbowed strut adapted to travel from a first elbowed position to a second elbowed position through a position in which the strut is straight,
 the strut connecting an engine mount to a mount for a saw means through a pivot point,
 wherein a rotational force applied to the strut straightens the strut and then rotates it through center whereby the saw means may take up two stable positions at right angles to each other and travel speed of the strut is hydraulically controlled between the two stable positions.

According to a second broad aspect, there is provided a portable sawmill including:
 (a) first and second substantially rectangular end frames, each end frame comprising two horizontal and two vertical members;
 (b) separate rails extending longitudinally relative to the end frames, each rail being slidably connected by means of a bracket to respective of said vertical members of the first and second end frames;
 (c) brackets for slidably connecting said rails to corresponding first and second ones of said vertical members;
 (d) first and second winding means in combination with respective first and second ones of said uppermost horizontal member;
 (e) an idler wheel located at a lower end of each vertical member;
 (f) flexible joining means for connecting each bracket with the respective winding means and the respective idler wheel in such a manner that positive up-and-down movement in unison of the rails at each end frame is achieved to adjust and retain in an adjusted position the rails at each end frame; and
 (g) a carriage for a prime mover and saw blade mounting movably engageable with said rails.

BRIEF DESCRIPTION OF THE DRAWINGS

In the following more detailed description of one embodiment of the invention, reference will be made to the accompanying drawings in which.

DETAILED DESCRIPTION OF THE INVENTION

The "flexible joining means" referred to in the specification and claims means such things as rope (natural, synthetic or wire) and chains.

Figure 1:
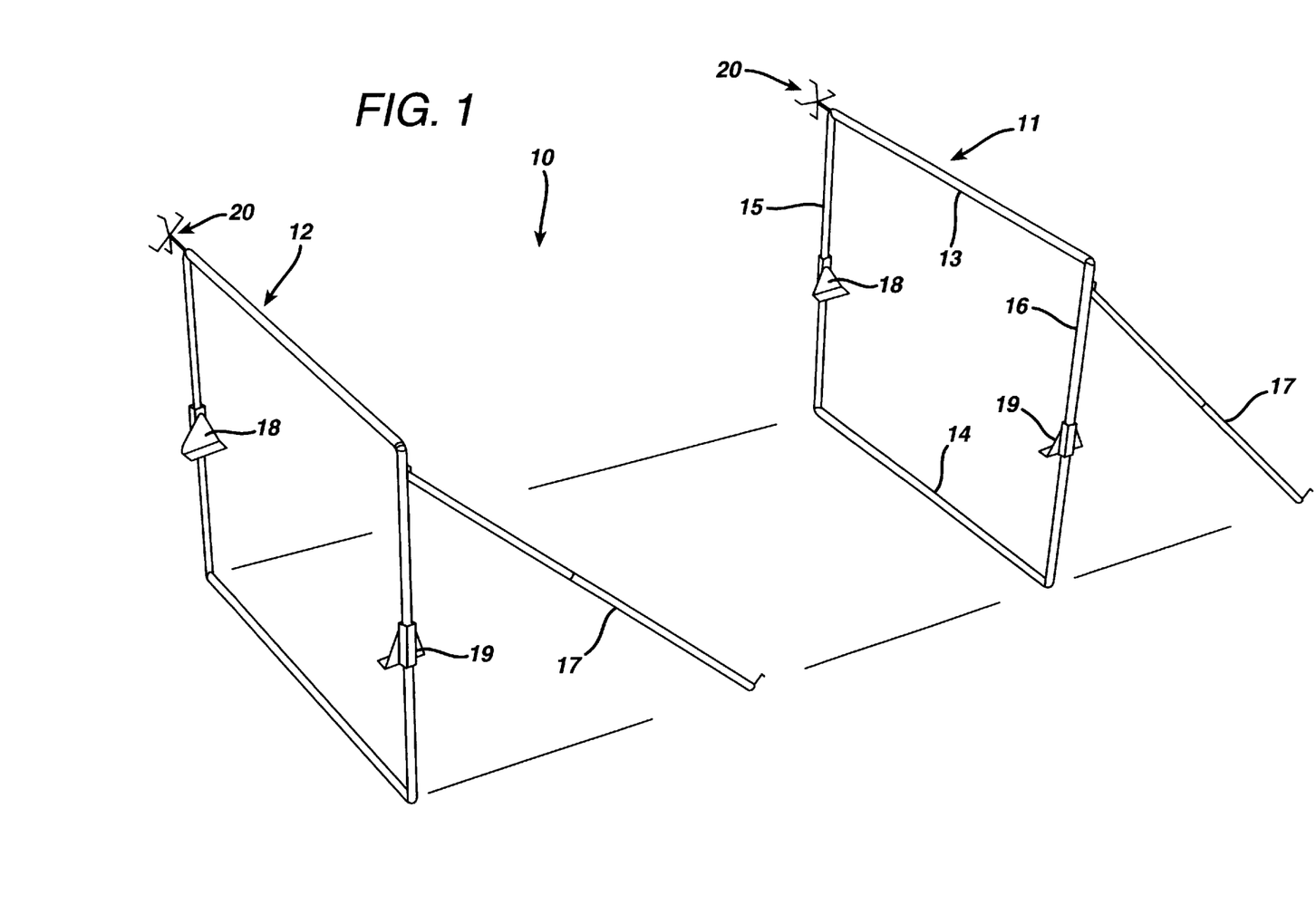
FIG. 1 is an isometric view from one side of the framework in the set-up position.

Turning to the drawings, a rectangular framework is indicated generally by numeral 10. The framework includes rectangular end frames 11 and 12. Each end frame comprises upper and lower members 13 and 14 respectively and side members 15 and 16 respectively. In FIG. 1 a telescopic brace means 17 is shown propping each end frame in a substantially upright position. Being telescopic the length of the brace means 17 can be adjusted.

One end of the brace means 17 is coupled to the side member 16, while the other end engages with the ground. The telescopic brace means 17 are shown as lying in a plane substantially at right angles to the plane of the end frame. Brace means 17 thus provide lateral support while assembling the mill.

Side members 15 and 16 are respectively fitted with brackets 18 and 19 which are slidable along the length of the side member. As can be seen in FIG. 1, each bracket has a ledge on which a rail (as hereinafter described) can be engaged. A winding means 20 shown associated with the upper member 13 and side member 15 is provided to control the sliding movement of the brackets 18 and 19 as will be hereinafter described.

Figure 2:
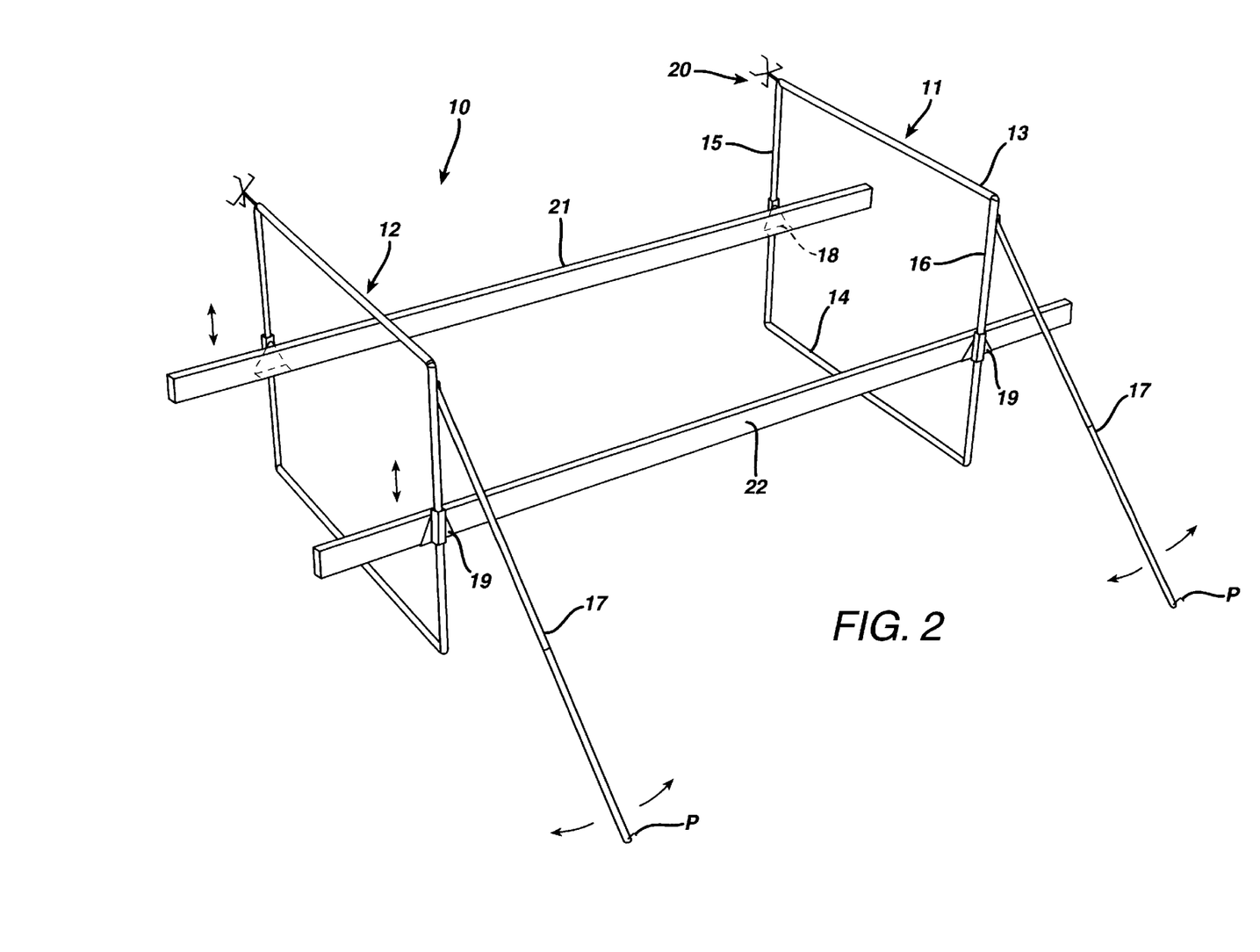
FIG. 2 is a similar view to FIG. 1 but refers to the operating position with rails added and brace means turned 90°.

In FIG. 2, longitudinal rails 21 and 22 are shown as spanning the side members 15 and 16 of the end frames 11 and 12. The longitudinal rails 21 and 22 are engaged with the slidable brackets 18 and 19. Each side rail is accordingly adjustable up or down (as indicated by the arrows in FIG. 2) by movement of the slidable brackets 18 and 19 on the side members 15 and 16, respectively.

In FIG. 2 the brace means 17 are shown as located in the operating position such as to provide lateral support while sawmilling. As illustrated the brace means 17 have been moved (the coupling of the end of the brace means 17 to the side member 16 being such as to permit this) so that the brace means 17 basically lies in the plane of the end frame. As indicated by the arrows in FIG. 2, the position of the brace means can be moved to achieve the best bracing position. When in position the lower end of the brace means 17 is firmly engaged with the ground by a pinning means P shown at the ground engaging end of the brace means.

Figure 3:
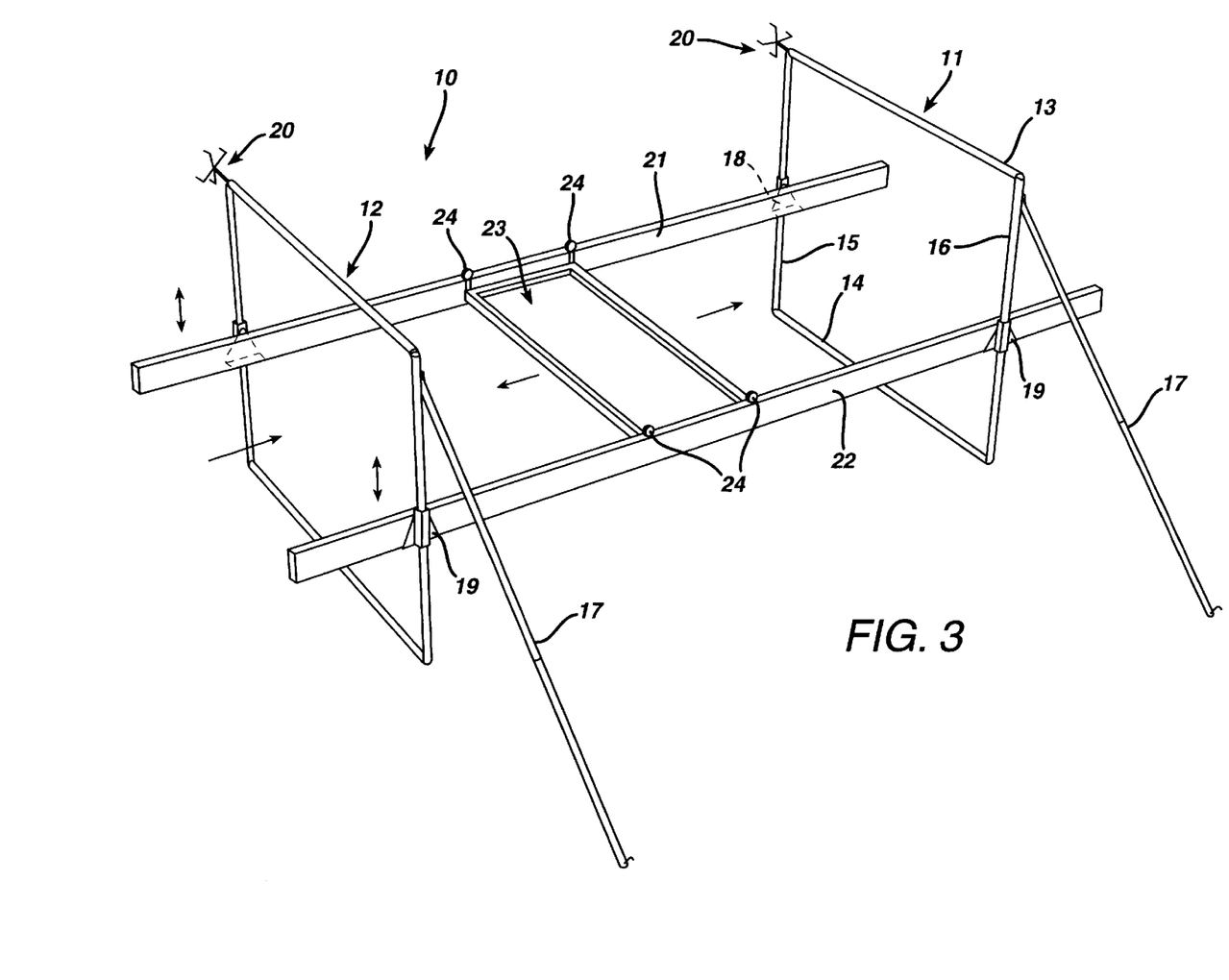
FIG. 3 is a similar view to FIG. 2 with the addition of a support means for an engine and saw means.

In FIG. 3 a support means or frame 23 is shown as spanning between the longitudinal rails 21 and 22. This support means provides a carriage for an engine and saw means combination 25 (see FIG. 4). Wheels 24 are provided at each end of the support frame 23 whereupon the support frame 23 is movable on the side rails 21 and 22 in a longitudinal direction relative to the frame 10 as shown by the arrows in FIG. 3. Thus, the support frame 23 can be moved along the rails toward or away from the respective end frames 11 and 12.

Figure 4:
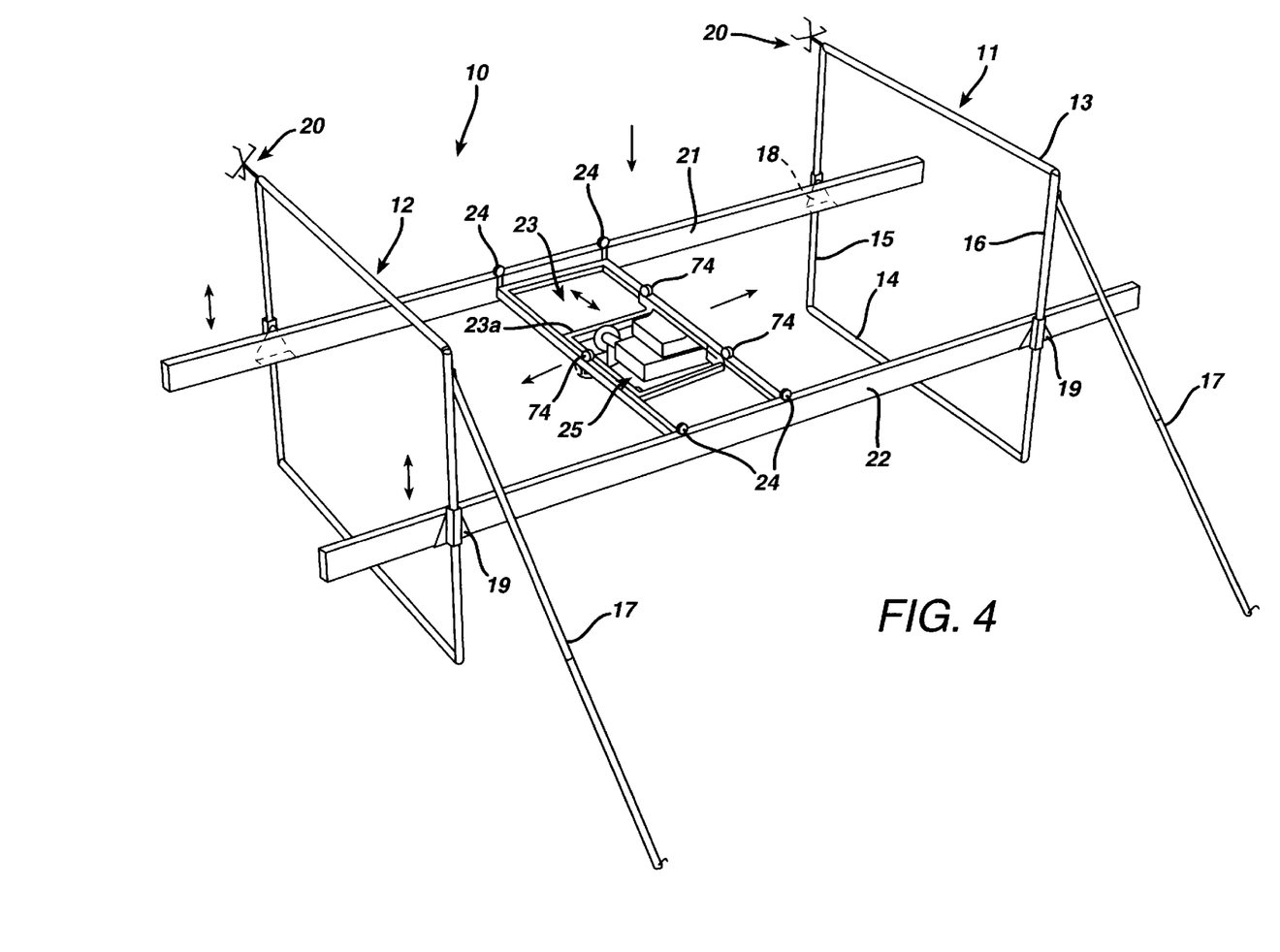
FIG. 4 is a similar view to FIG. 3 with the addition of the engine and saw means.

In FIG. 4 there is shown a further support frame 23a which is mounted by three wheels 74 so that it is movable longitudinally relative to the long side of support frame 23. AS will hereinafter be described, this second movable frame 23a supports the engine and saw means combination 25.

Thus, by a combination of the movement of support frame 23 along rails 21 and 22 and support frame 23a relative to support frame 23, the position of the engine and saw means combination 25 relative to frame 10 can be readily adjusted.

Figure 5:
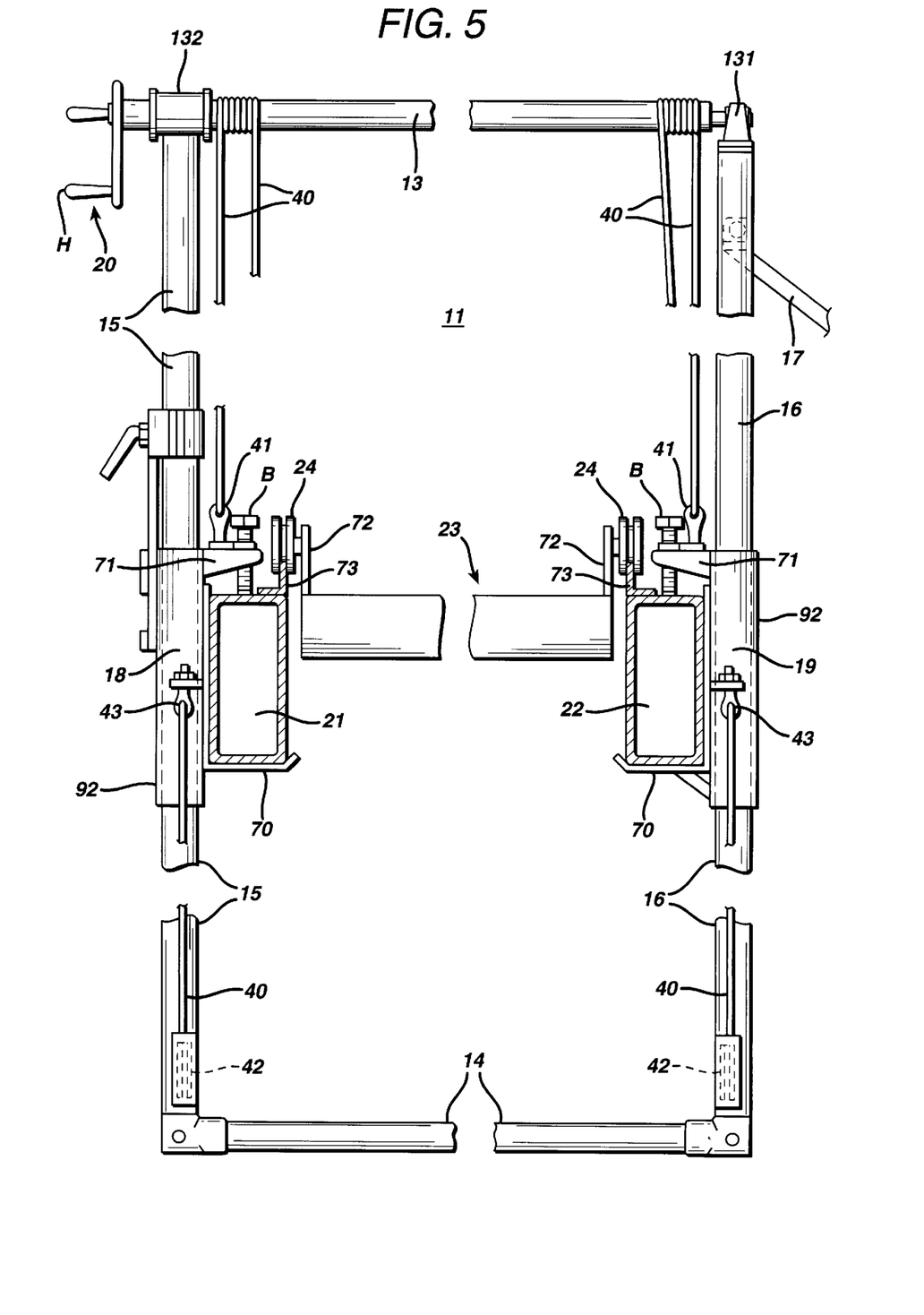
FIG. 5 is a front view of an end frame showing the position of winding means.
Figures 6, 11:
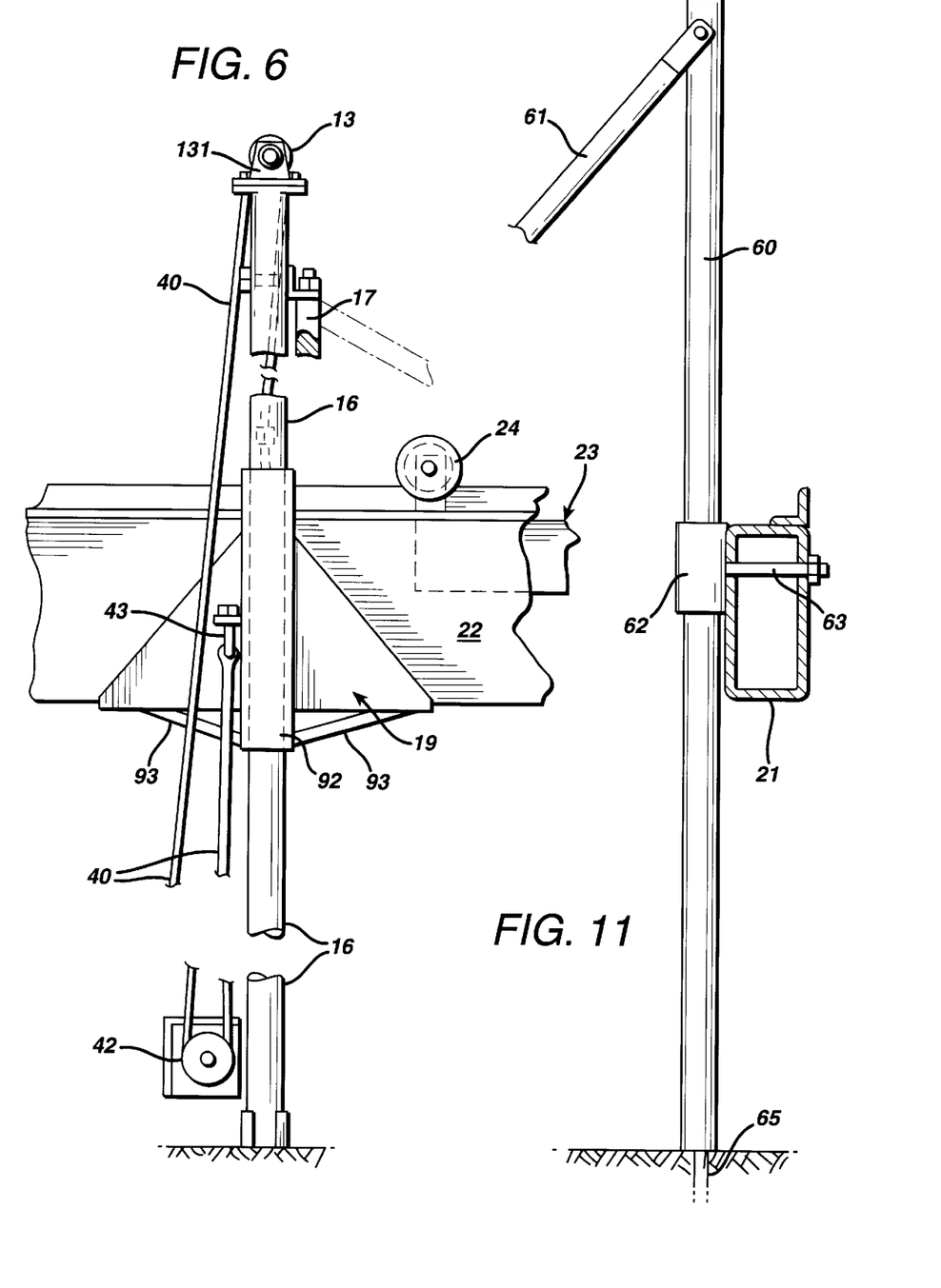
FIG. 6 is a side view of the end frame of FIG. 5.
FIG. 11 is a side view of the brace means illustrated in FIG. 10.

Turning now to FIGS. 5 and 6, a more detailed illustration of the winding means 20 is provided, this being shown in combination with end frame 11.

As illustrated the upper member 13 is provided with a stub axle at one end which is journalled in bearing 131 mounted with the upper end of side member 16. The upper member 13 is further journalled in a bearing 132 provided at the upper end of side member 15. The end of the upper member 13 engaged in bearing 132 extends beyond the bearing and is provided with a handle H.

Accordingly, by applying a rotational movement to the handle H the upper member 13 can be rotated.

Flexible joining means 40 (which for ease of convenience will hereinafter be referred to as "rope 40") is shown wrapped around the rotatable upper member 13 adjacent each of bearings 131 and 132. Rope 40 is attached to a first lug 41 on slidable bracket 18. The other end of rope 40 runs around idler wheel 42 located at the lower end of side member 15 to a second lug 43 attached to and positioned about halfway up slidable bracket 18. Rope 40 adjacent bearing 131 is similarly coupled with slidable bracket 19.

Thus, by rotating handle H and thereby upper member 13, the slidable members 18 and 19 can be simultaneously caused to raise or lower relative to the direction in which handle H is rotated. The configuration is such that ropes 40 pull the sliding members 18 and 19 down when the handle H is rotated for downward movement. Thus, the sliding members 18 and 19 do not move down simply under gravity.

FIG. 5 shows in more detail the mounting of the side rails 21 and 22 with brackets 18 and 19, respectively. Referring to rail 21, it will be seen that the rail is of substantially rectangular cross-section with the lower end thereof resting on ledge 70 of bracket 18. Disposed above ledge 70 and also above the upper edge of rail 21 is a projection or land 71 with which lug 41 is engaged. Threaded through land 71 is a locking bolt B which has its lower end engaging with the upper surface of rail 21 to provide a downward force to ensure that the rail 21 is locked in position on ledge 70. As shown ledge 70 has a lip at its outer end to ensure rail 21 is firmly held in place.

As also can be seen in FIG. 5, each wheel 24 is mounted by an axle projecting from a flange 72 (of an angle piece—see FIG. 7) extending up from the corner of support frame 23. Wheel 24 is preferably grooved and engages with the edge of a substantially L shaped rail 73 mounted to the upper edge of side rail 21.

FIG. 5 also shows that each of sliding members 18 and 19 includes a sleeve 92 which is slidably engaged on the side member 15, 16. Sleeve 92 is of a significant length being longer than the depth of rail 21, 22. Projection 71 is attached to the upper end of the sleeve 92.

As can be seen in FIG. 6, sliding members 18, 19 also extend well beyond each side of the sleeve 92 and a brace 93 extends from the lower end of sleeve 92 to each outer end of the ledge 70.

Figure 7:
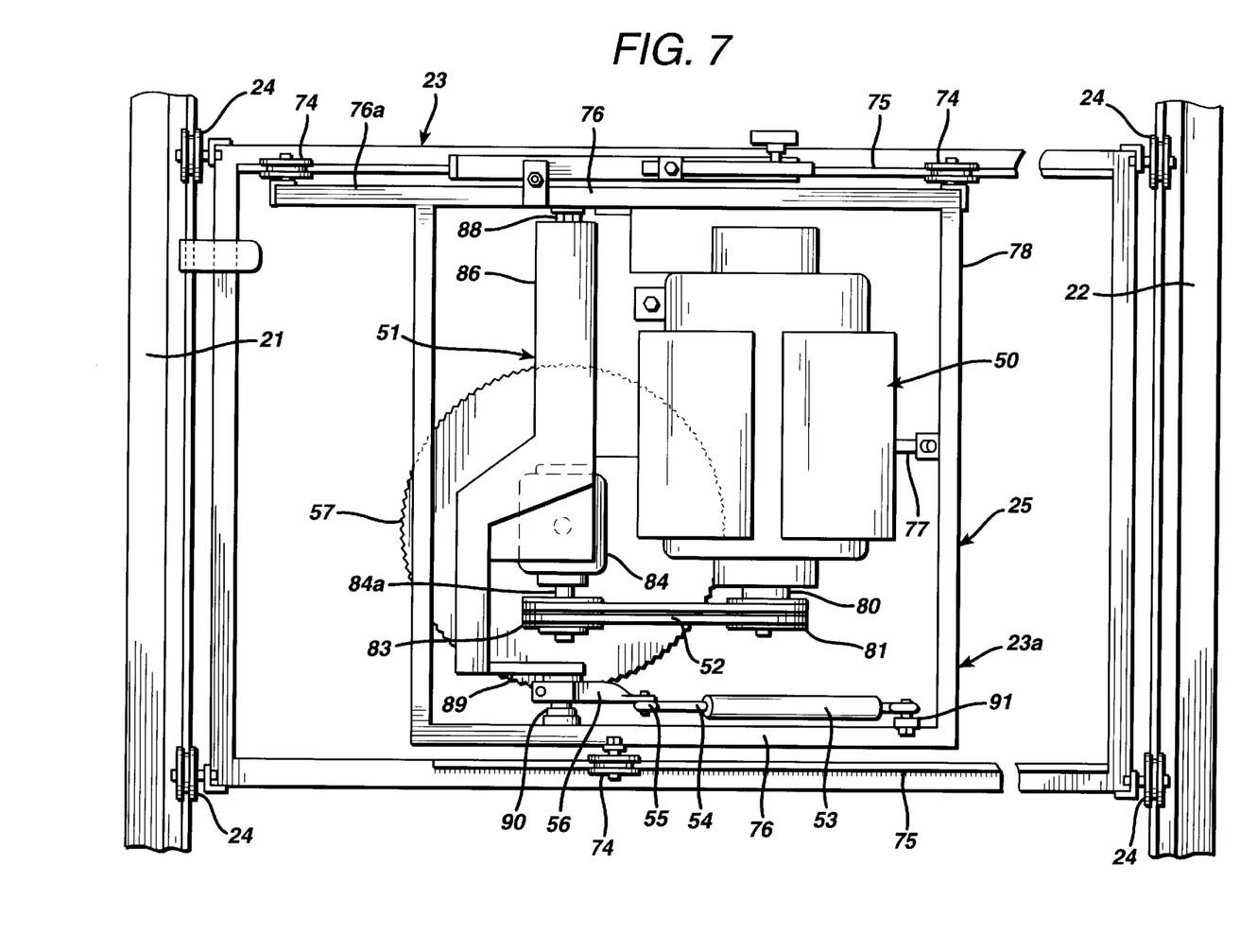
FIG. 7 is a top view of the support means together with the saw means and engine.

As can be more clearly seen in FIG. 7, support frame 23a is movably mounted by what can be termed a tricycle carriage, namely two wheels 74 running (in a similar manner to wheels/rails 24 and 73) on a rail 75 which extends the full length of the long side of support frame 23. Extending for nearly the full length of the other long side of support frame 23 is a further rail 75 on which a single wheel 74 associated with side member 76 of frame 23a is engaged. As can also be seen in FIG. 7, one of the wheels 74 is mounted with an extension 76a of the other side member 76 of frame 23a.

Figure 8:
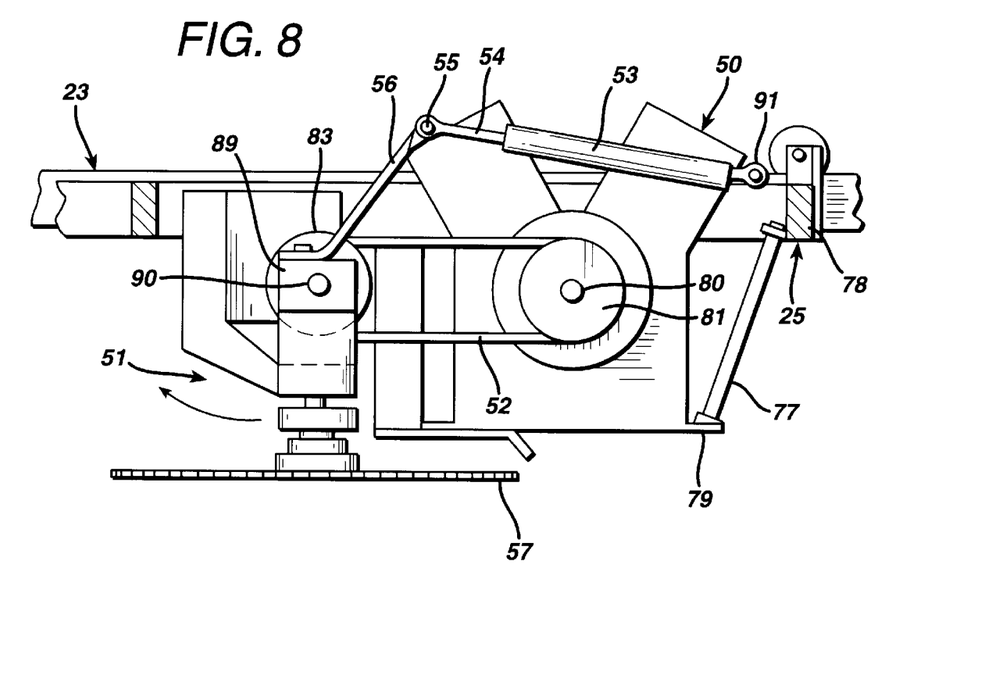
FIGS. 8 and 9 are successive end views of the saw means and engine illustrated in FIG. 7 a illustrating the use of a strut means.
Figure 9:
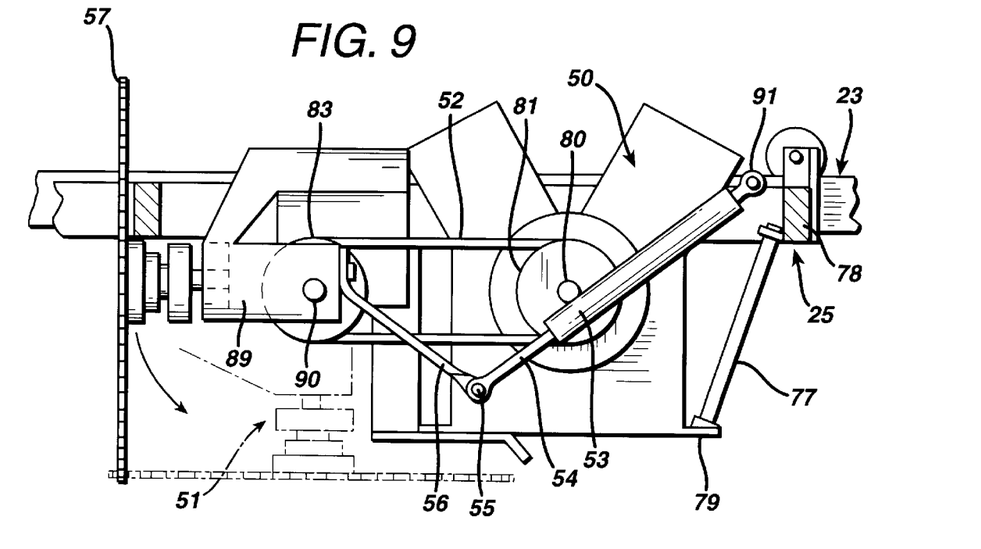

As can be seen in FIGS. 7, 8 and 9, motor 50 is suspended from support frame 23a. A brace 77 extends from side member 78 of the support frame 23a and engages with a base or mounting portion 79 of motor 50. Brace 77 provides resistance against movement of motor 50 as a consequence of torque of the motor during operation.

Motor drive shaft 80 has mounted thereon a belt pulley 81 about which belt(s) 52 extend to pulley wheel 83 mounted on shaft 84a of a drive transfer 84 and with which is mounted a sawblade 57.

The driver transfer 84 is carried by a sawblade spindle mounting 86 which is a generally z-shaped member as viewed in FIG. 7 pivotally coupled at one end at 88 to side member 76 of support frame 23a. An arm 89 is attached to the other end of the z-shaped member 87. This arm 89 is in turn coupled via pivot mounting 90 to the opposite side frame member 76.

An oil fitted gas strut 53 has the body portion thereof pivotally mounted at 91 to side member 76 while the piston rod 54 is pivotally mounted at 55 to a connecting arm 56 joined to arm 89 of the sawblade spindle mounting 86.

FIG. 7 shows the sawblade 57 in a substantially horizontal position, i.e., it is substantially parallel to the plane of support frames 23 and 23a. This is the configuration as shown in FIG. 8. However, as will hereafter be explained, the spindle mounting 86 can be caused to pivot about its pivots 88 and 90 in the direction as shown in FIG. 8 so that the sawblade 57 can be moved to a substantially vertical position as shown in FIG. 9.

Figure 10:
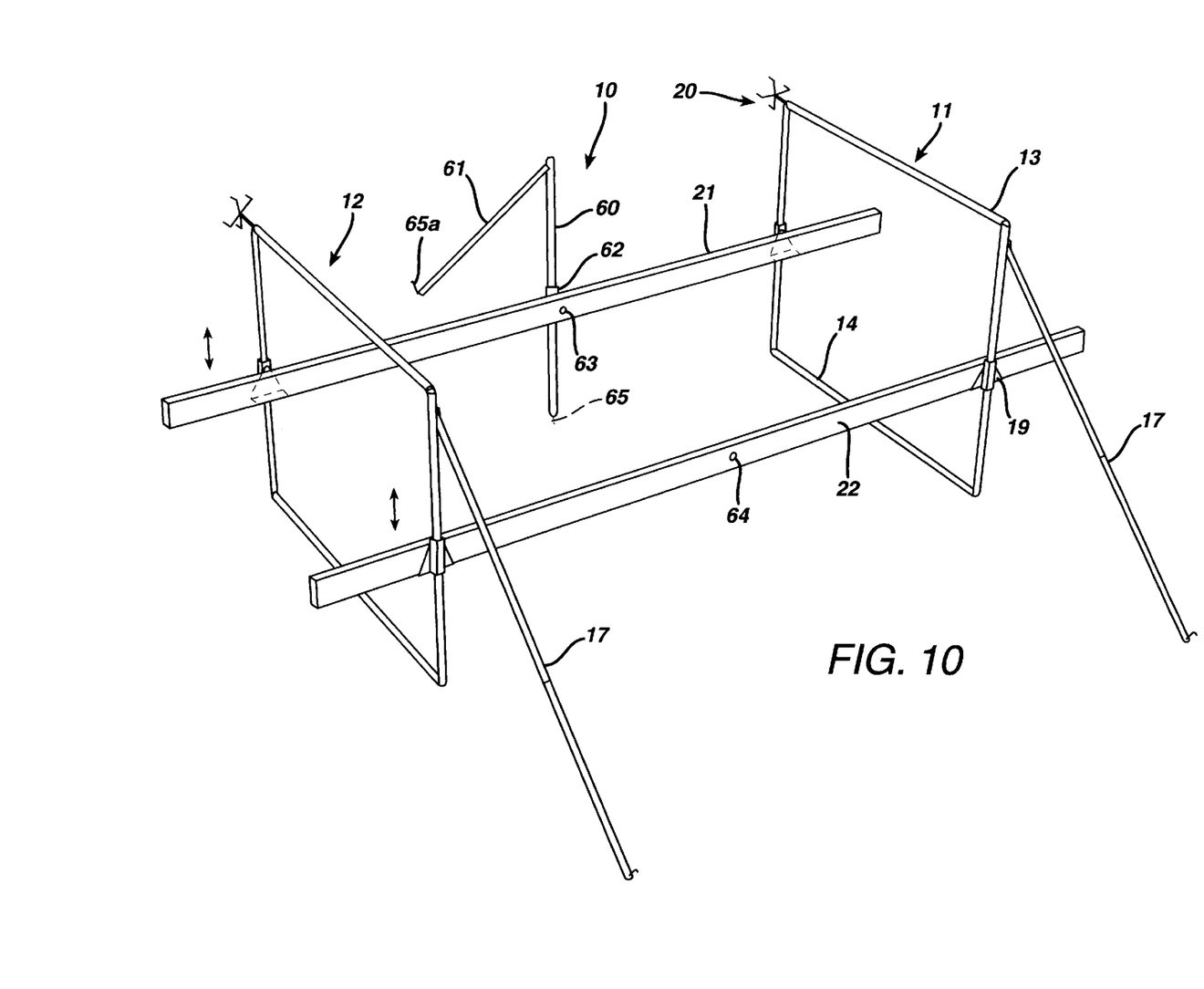
FIG. 10 is a similar view to FIG. 2 but showing the use of a brace means in connection with a rail.

Turning to FIGS. 10 and 11, a rail support 60 is supported by a secondary prop 61. A sleeve means 62 joins support 60 to rail 21. This sleeve means 62 is connected to rail 21 by bolt 63. A hole 64 is indicated in the other rail 22 and accommodates a bolt similar to 63 to thereby mount a support 60. A spike 65 is positioned at the lower end of brace support 60 to assist its placement in the ground. Similarly, a spike 65a or similar is used to engage the end of the prop 61 which engages with the ground. This support 60 and prop 61 provide a further bracing to the rails 21 and 22 to thereby further assist in rigidifying the frame 10.

As can be seen in FIGS. 8 and 9, the low mounting of engine 50 (and thereby drive shaft 80) relates to the desirability perceived by the inventor of keeping the center of gravity of the engine close to where the saw 57 engages the timber. Consequently, the center line of the drive shaft 80 is mounted below and as close as possible to the axis through which the sawblade spindle mounting 86 pivots about the pivot mounts 88 and 90.

The strut 53 with connecting link 56 forms a resilient elbowed strut adapted to travel from a first position, e.g., FIG. 8 to a second position (e.g., FIG. 9) through a position in which the strut is straight. Thus, a rotational force applied to the strut about pivot 91 causes the strut to move from a position to a straight position and then through center. Consequently, the sawblade spindle and hence the sawblade 57 can be moved to take up two stable positions at right angles to each other. The speed of travel between the two stable positions is controlled hydraulically by the oil fitted gas strut, the oil modulating the speed of operation of the piston coupled to rod 54.

Preferably, a self-energizing brake is combined with one or each of the winding arrangements 20. The self-energizing brake is constructed so as to store energy which may be used to provide braking power. Thus, such a brake when combined with the winch or winding arrangement controls the operations of the winch and thereby the upward and downward movements of the rails 21 and 22 when such are being adjusted in position relative to the end frames 11 and 12.

The claims defining the invention are as follows:

1. A portable sawmill with lateral and longitudinal stability, comprising:

(a) first and second substantially rectangular end frames, each end frame comprised of spaced vertical frame members, a lower ground engaging frame member and an upper frame member spaced from the lower frame member;

(b) a brace connected to each end frame to laterally support the respective end frame;

(c) a pair of longitudinal rails mounted on corresponding vertical frame members of the first and second end frames;

(d) individual brackets slidably mounted on each of the vertical frame members for slidably connecting individual said rails to said first and second end frames such that the rails are extendable beyond the end frames, each of the brackets being unconnected with other said brackets;

(e) first and second winding assemblies on the respective first and second end frames, each winding assembly including bearings journalling said upper frame member, a handle to rotate the upper frame member, an idler wheel located at a lower end of each said vertical frame member, and a flexible joining connection for each bracket, each joining connection being engaged about the respective upper frame member and a respective idler wheel and connected at both ends to the respective bracket to move the bracket in both directions up and down the respective vertical frame member to thereby adjustable move the respective ends of said rails in unison between upper and lower positions on the respective end frames and for retaining said rails in an adjusted position; and (f) a first carriage engageable with said rails and longitudinally movable thereon; and (g) a pivotal saw blade and a prime mover therefor mounted to said first carriage and moveable thereon laterally relative to said rails.

2. A portable sawmill as claimed in claim 1, wherein each said brace is connected to each said respective end frame with a connection connected to an upper region of the respective end frame, each brace having an attitude which is adjustable such that each brace is movable with respect to its respective end frame to selectively provide longitudinal or lateral support to the sawmill.

3. A portable sawmill as claimed in claim 1, further comprising a rail brace including:

(a) a vertical extending support;

(b) a lateral brace member connected to the upper end of the support and adapted to engage the ground; and (c) a sleeve adapted to extend at least partially around the support, the sleeve having an attachment to connect to one of said rails.

4. A portable sawmill as claimed in claim 1, wherein said prime mover includes a motor and a motor drive shaft, the drive shaft having a center line which is adjacent to but generally beneath a pivotal mounting axis of said saw blade.

5. A portable sawmill as claimed in claim 1, further comprising a pivot control assembly, comprising:

an elbowed strut having a first arm pivotally connected to an extendable and retractable second arm which is biased to an extended position, the strut connecting said carriage and a mounting for said saw blade, the strut being movable from one angular relationship of the first and second arms to another angular relationship to move an axis of the saw blade mounting between positions of the saw blade at right angles to each other.

6. A portable sawmill as claimed in claim 1, further comprising a second carriage mounted for movement on the first carriage in a direction transverse to the rails, and said second carriage mounting said prime mover and a mounting for said saw blade.

7. A portable sawmill as claimed in claim 1, wherein each said brace is adjustable in length.

8. A portable sawmill as claimed in claim 1, wherein each bracket comprises:

a sleeve engaged on the respective vertical frame member;

a rail support carried by the sleeve and including a ledge for holding the respective rail; and first and second lugs to receive the ends of the flexible joining connection.

9. A portable sawmill as claimed in claim 1, wherein said first carriage is longitudinally movable with said rails through said end frames so as to extend beyond said end frames.

* * * * *